(12) United States Patent
Tiemann

(10) Patent No.: US 6,837,053 B2
(45) Date of Patent: Jan. 4, 2005

(54) GAS TURBINE COMBUSTION CHAMBER AND AIR GUIDANCE METHOD THEREFORE

(75) Inventor: Peter Tiemann, Witten (DE)

(73) Assignee: Siemens Aktiengesellschaft, Munich (DE)

( * ) Notice: Subject to any disclaimer, the term of this patent is extended or adjusted under 35 U.S.C. 154(b) by 50 days.

(21) Appl. No.: 10/174,947

(22) Filed: Jun. 20, 2002

(65) Prior Publication Data

US 2003/0000219 A1 Jan. 2, 2003

(30) Foreign Application Priority Data

Jun. 20, 2001 (EP) .............................. 01115026

(51) Int. Cl.[7] .............................. F02C 7/18; F23R 3/02
(52) U.S. Cl. .............................. 60/752; 60/756; 60/757; 60/758; 60/760
(58) Field of Search .......................... 60/752, 753, 754, 60/755, 756, 757, 758, 759, 760, 776, 798

(56) References Cited

U.S. PATENT DOCUMENTS

| | | | |
|---|---|---|---|
| H001380 H | * 12/1994 | Halila et al. | ................. 60/757 |
| 5,467,815 A | 11/1995 | Haumann | |
| 5,737,922 A | 4/1998 | Schoenman | |
| 6,047,552 A | 4/2000 | Gross | |
| 6,276,142 B1 | * 8/2001 | Putz | ............................ 60/752 |

FOREIGN PATENT DOCUMENTS

| | | | |
|---|---|---|---|
| EP | 0 624 757 | | 5/1994 |
| WO | WO99/09354 | * | 2/1999 |

* cited by examiner

*Primary Examiner*—Ted Kim
(74) *Attorney, Agent, or Firm*—Harness, Dickey & Pierce, P.L.C.

(57) ABSTRACT

In order to provide a method of air guidance and a design for a gas turbine combustion chamber which permits improved cooling and reduced pressure losses and which avoids the overcooling phenomena by specific reaction to hot spots, a gas turbine combustion chamber includes a casing and at least one hollow element. The at least one hollow element is in connection with air guidance regions of the combustion chamber via at least two openings. As such, a tangential through-flow exists with a subsequent axial flow to the burner.

32 Claims, 2 Drawing Sheets

GAS TURBINE COMBUSTION CHAMBER AND AIR GUIDANCE METHOD THEREFORE

The present application hereby claims priority under 35 U.S.C. Section 119 on European Patent application number 01115026.5 filed Jun. 20, 2001, the entire contents of which are hereby incorporated by reference.

FIELD OF THE INVENTION

The present invention generally relates to a gas turbine combustion chamber. More preferably, it relates to one having a casing accommodating a combustion chamber and at least one burner arranged in an end region. In addition, the invention generally relates to an air guidance method in a gas turbine combustion chamber.

BACKGROUND OF THE INVENTION

Combustion chambers of the generic type, in particular closed, cooled combustion chambers, are employed for highly efficient gas turbines. These usually include a multishell construction of essentially conical design, usually with circular cross section, with at least one, usually also a plurality of burners, arranged at one end, an air/fuel mixture being supplied to which burner. The burners protrude into an essentially conical configuration of combustion space. The combustion chamber must, on the one hand, be cooled and, on the other hand, the air guided to the burner has to preheat the fuel gas.

In the case of closed, cooled combustion chambers known from the prior art, air is guided by impingement cooling through a support structure onto a plate exposed to the fuel gas and flows through the gap between plate and support structure in the axial direction to the burner. In this region, the plate cools convectively. Such designs have the disadvantage that, in the case of the narrow but axially long designs, the cooling in the convective region can only be mastered by relatively high flow velocities of the cooling air, which leads to increased pressure losses and therefore to sacrifices in efficiency. A further disadvantage of known solutions consists in the fact that there is no possibility of partial adjustment onto hot spots which have been found, so that the tendency is for components to be overcooled.

SUMMARY OF THE INVENTION

An embodiment of the present invention is based on an object of providing an air guidance method and/or a design for a gas turbine combustion chamber which, on the one hand, permit improved cooling at reduced pressure losses; and, in addition, avoid overcooling by specific reaction to hot spots, for example.

With respect to the technical solution, the design side of an embodiment of the invention proposes that it should exhibit at least one hollow element, which is in connection with other air guidance regions of the combustion chamber by at least two openings.

An embodiment of the invention provides for the arrangement or configuration of hollow elements on the combustion chamber, which hollow elements are in connection, via openings, with air guidance regions of the combustion chamber which are separated from the hollow elements. The configuration of the hollow elements can be directly achieved during the manufacture of the casing or they can be subsequently arranged in the casing.

According to an embodiment of the invention, the hollow elements are provided with at least two openings and are advantageously arranged or configured in such a way that they are used for tangential air guidance. The hollow elements can be arranged within the combustion chamber and can be in connection with air guidance regions in the outer region of the combustion chamber. Hollow elements can also be arranged on the outer region of the combustion chamber and be in connection with air guidance regions within the combustion chamber. Also within the scope of the invention is a multilayer construction, in which hollow elements are arranged on both the inside of the combustion chamber and the outside of the combustion chamber and are in connection with air guidance regions.

According to a particularly advantageous configuration of an embodiment of the invention, the air guidance regions can be configured between internally and externally located hollow elements.

According to an embodiment of the invention, one hollow element is configured as a tangential element. An embodiment of the invention provides for the inner wall region of a combustion chamber to be at least partially configured with hollow elements, which are in connection via openings with regions on the outside of the combustion chamber. The combustion chambers, which can have an essentially arbitrary cross section, can be directly configured with hollow elements during manufacture or can be covered subsequently with hollow elements.

The hollow elements are advantageously configured as radial segments covering an internal surface of the combustion chamber.

The outside of the combustion chamber is advantageously subdivided into air guidance regions separated from one another, for which purpose—in an advantageous proposal of an embodiment of the invention—essentially axially extending ribs are formed on the outside of the combustion chamber. In this arrangement, air guidance regions are configured which are used for the supply of air through openings into the hollow elements configured or arranged in the combustion chamber, and air guidance regions, into which the air coming from the hollow elements is introduced, are configured.

The hollow elements are closed hollow space configuration elements, in metallic, ceramic and/or comparable materials, which are in connection with the outside of the combustion chamber exclusively via the openings. The hollow elements are advantageously provided as radial segments with openings, in such a way that there is forced tangential air guidance in the peripheral direction.

According to an advantageous proposal of an embodiment of the invention, the casing can have a single-shell configuration. In addition, the casing can be integrally manufactured with ribs configured on the outside, by casting for example. According to an advantageous proposal of an embodiment of the invention, one pair of ribs is respectively provided with a cover in order to separate the air guidance regions. This, therefore, produces air guidance regions which are closed by a cover between two ribs, and which respectively enclose adjacent inter-rib spaces with an uncovered configuration.

In the design according to an embodiment of the invention, therefore, simple separation into air guidance regions separated from one another can take place by means of even-numbered rib configuration on the outside of the combustion chamber. The air guidance regions provided without cover are used for air supply. In this case, openings are configured in the axial direction which lead to hollow elements arranged on the inside of the combustion chamber.

The hollow elements then preferably have further openings offset in the peripheral direction (tangentially), which openings lead into the inter-rib spaces provided with cover and adjacent to the air supply region, the air being further guided in these inter-rib spaces. The air is then supplied to the burner.

According to an advantageous proposal of an embodiment of the invention, it is also possible to introduce the air, which is removed from the axially front regions, into further hollow elements and to further distribute it there.

In terms of cast-ability and complexity of the overall design, the design according to an embodiment of the invention is substantially simplified as compared with the multi-shell concepts known from the prior art. The cast-on ribs, furthermore, also provide desirable stiffening of the casing in the case of axially long designs.

The design described as above can also have a reverse configuration if the ribs protruding into the combustion chamber are covered in pairs in order to form axial air guidance regions. In this case, hollow elements are positioned further outside the air guidance regions in the casing in order to form a tangential air guidance system there. The air guidance regions connected to the hollow elements can also be positioned between the internally and externally located hollow elements. In these cases also, single-shell casing designs are possible but multi-shell designs, in which tangential and axial air guidance regions are alternatively configured, can also be realized. In this way, axial air guidance regions can be formed in the described manner by rib formation with covering in pairs, while tangential air guidance regions are likewise formed by suitable rib configuration and coverings.

An embodiment of the invention realizes a completely new method of air guidance in a gas turbine combustion chamber, in which the air is distributed in the peripheral direction (tangentially) into the combustion chamber cooling regions on the inside of the combustion chamber. This provides the possibility of specifically cooling individual regions in which, for example, hot spots occur. Here again, reversals of the method are within the scope of the invention, i.e. the alternative or additional configuration of air guidance regions through which air flows tangentially on the combustion chamber outer region or a central region.

With respect to the method, an embodiment of the invention proposes that air should be introduced from a first region outside the combustion chamber through at least one first opening into a hollow element arranged within the combustion chamber, continues through this by means of at least one second opening into a second region outside the combustion chamber and finally continues in the direction of the burner.

The tangential air guidance system, according to an embodiment of the method, for cooling the combustion chamber and the subsequent axial guidance to the burner effect an improved and specific cooling of the combustion chamber without increased pressure losses and, therefore, without sacrifices of efficiency. Even axially long designs can be sufficiently cooled using normal cooling air flow velocities. Overcooling effects are unnecessary.

The radial cooling principle according to an embodiment of the invention additionally permits, without substantial design complexity, combination with impingement cooling arrangements, known per se. Thus, arbitrary adaptation possibilities for the cooling in the axial direction are not only provided by the radial cooling principle according to an embodiment of the invention but also due to its variability with respect to combinations.

An embodiment of the invention proposes a gas turbine combustion chamber design which can be manufactured at low economic cost and an effective air cooling principle, which obviate the disadvantages of the prior art.

BRIEF DESCRIPTION OF THE DRAWINGS

Further advantages and features of the invention are given by the following description using the figures. In these.

In the figures, similar parts are provided with similar designations.

DETAILED DESCRIPTION OF THE PREFERRED EMBODIMENTS

Figure 1:
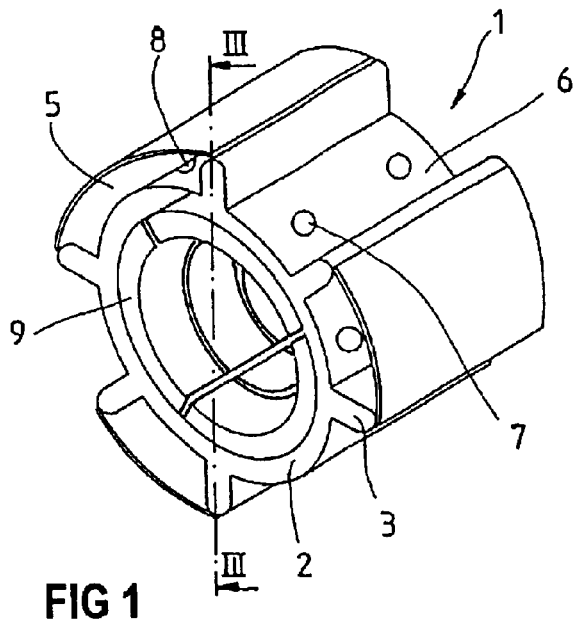
FIG. 1 shows a perspective representation of an exemplary embodiment of a gas turbine combustion chamber.
Figure 2:
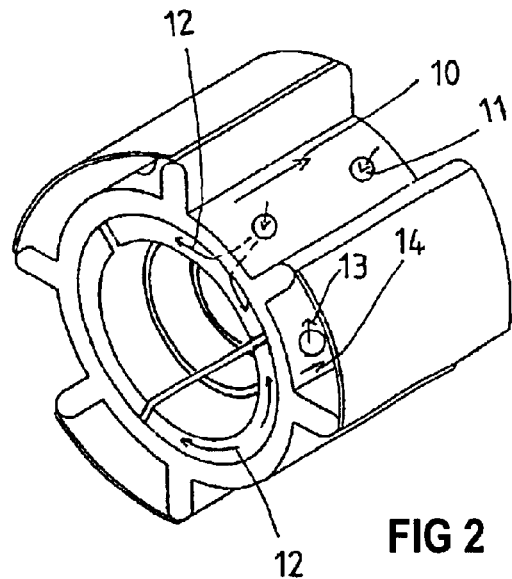
FIG. 2 shows a representation according to FIG. 1 with the additional representation of the air guidance.
Figure 3:
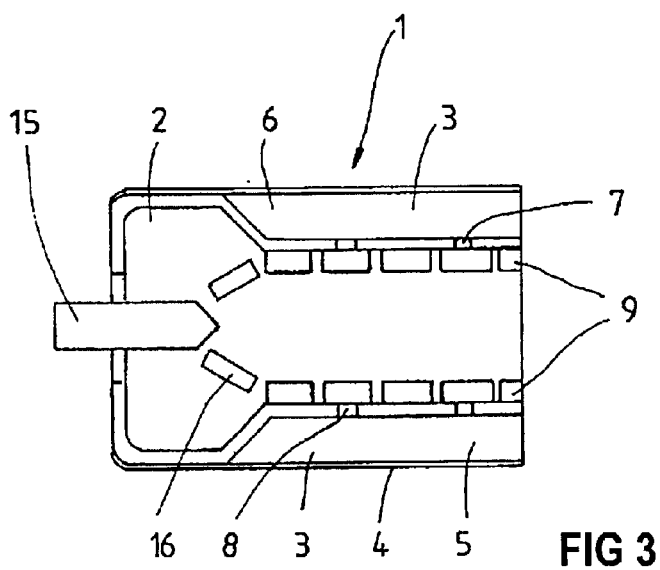
FIG. 3 shows a section through a combustion chamber as shown in FIG. 1.

FIGS. 1, 2 and 3 show a combustion chamber 1 which, in the exemplary embodiment shown, includes a cast, single-shell casing 2 onto which ribs 3 are cast. In respective pairs, the ribs are closed by subsequently applied cover sheets 4, for example. This therefore produces closed air guidance regions 5 and open air guidance regions 6. Openings 7 and 8 are respectively configured in the open air guidance regions 6 and the closed air guidance regions 5 and these openings 7 and 8 are guided directly to hollow elements 9 arranged on the inner wall of the combustion chamber.

A burner 15, whose fuel gas guidance leads into the combustion chamber in the usual way, is arranged at the end of the combustion chamber. Hollow elements 16 are guided toward the burner.

The hollow elements 9 are metallic elements, ceramic elements, hollow bricks or similarly suitable elements, which are also formed from combinations of the materials quoted. The hollow elements are, respectively, essentially connected to a central region with an opening 7 of an open air guidance region 6, and into the end regions, respectively with openings 8, of a closed air guidance region 5.

The result is the air guidance system shown in FIG. 2. The open air guidance regions 6 are used for the air supply 10, from which the flow 11 through the opening into the hollow elements 9 branches off. Flow-influencing auxiliary elements, air guide plates, baffles, opening expansions and the like can be employed for support and/or for control. After the flow 11 through the opening, an essentially tangentially extending radial flow 12 occurs through the hollow elements. In the end regions of the hollow elements, the return flow 13 through the openings 8 takes place in respectively closed air guidance regions 5. The air removal 14 then takes place in these as far as the burner 15. Hollow elements 16 can also be employed here for direct air supply support.

Figure 4:
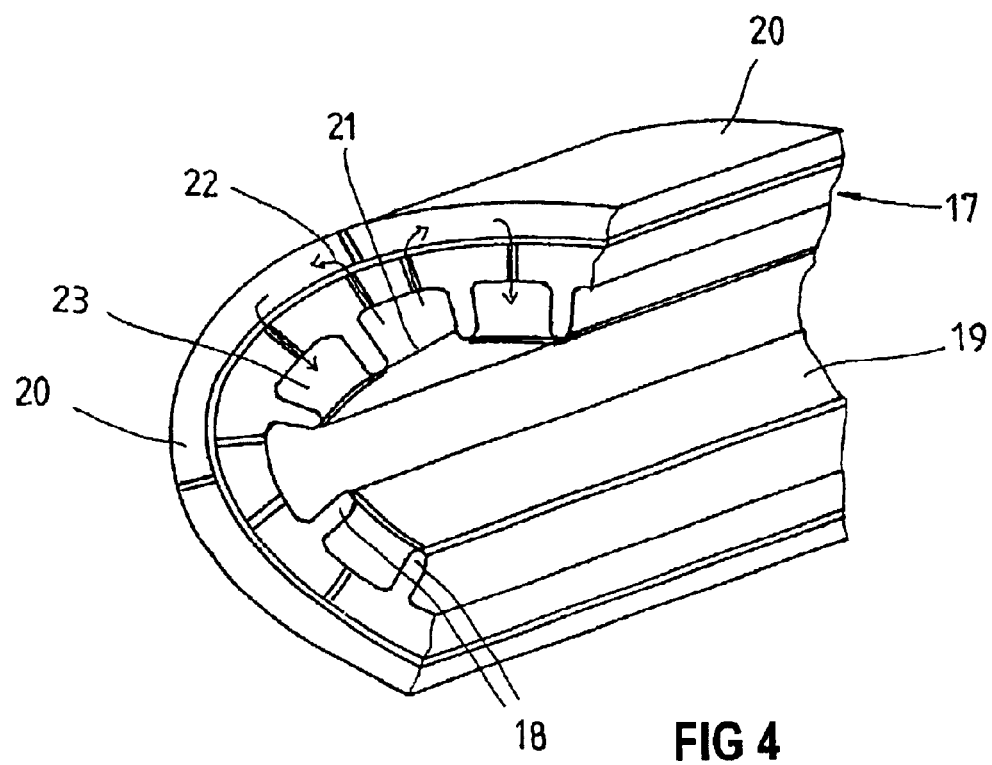
FIG. 4 shows a representation in principle of an alternative exemplary embodiment of a gas turbine combustion chamber and FIG. 5 shows a further representation in principle of a further alternative exemplary embodiment of a gas turbine combustion chamber.

An alternative exemplary embodiment is represented diagrammatically in FIG. 4. This differs from the previously described example in that an inner shell 17 is configured with ribs 18 pointing into the combustion chamber, which ribs 18 are covered in pairs by covers 19. Axial air guidance regions 21 and 23, which are separated from one another, are therefore formed. Hollow elements 20 are arranged outside the inner shell 17 and these are connected in the manner described via at least two openings to the axial air guidance regions 21 and 23 separately located inside, so that a tangential air flow 22 forms.

Figure 5:
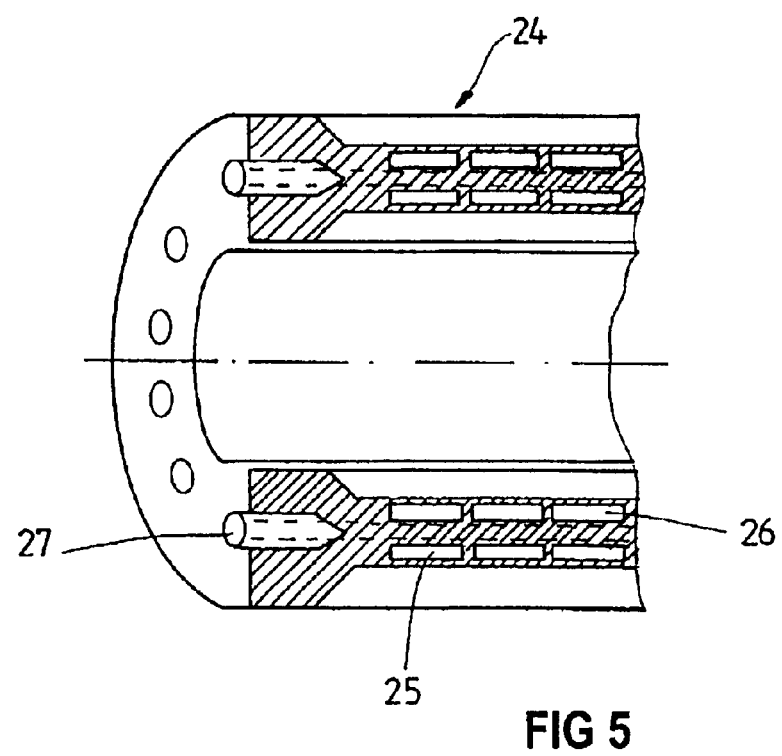

FIG. 5 shows a further representation in principle of an exemplary embodiment in which, in the case of a combustion chamber 24, both internally located hollow elements 26 and externally located hollow elements 25 are configured, axial air guidance regions 27 being formed between them. The air guidance principle corresponds to the previous exemplary embodiments, i.e. air is supplied through axial air guidance regions 27 and is introduced through openings (not shown) in hollow elements in the inner region and outer region, where a tangential airflow occurs, the air subsequently re-entering from the hollow elements into axial air guidance regions and being supplied to the burner or the burners.

The exemplary embodiment described is only used for explanation and is not limiting.

| List of designations | |
|---|---|
| 1. | Gas turbine combustion chamber |
| 2. | Casing |
| 3. | Rib |
| 4. | Cover |
| 5. | Air guidance region |
| 6. | Air guidance region |
| 7. | Opening |
| 8. | Opening |
| 9. | Hollow element |
| 10. | Air supply |
| 11. | Flow through opening |
| 12. | Radial flow |
| 13. | Return flow through opening |
| 14. | Air removal |
| 15. | Burner |
| 16. | Hollow element |
| 17. | Inner shell |
| 18. | Ribs |
| 19. | Cover |
| 20. | Hollow element |
| 21. | Axial air guidance region |
| 22. | Tangential air guidance |
| 23. | Axial air guidance region |
| 24. | Combustion chamber |
| 25. | Hollow element |
| 26. | Hollow element |
| 27. | Axial air guidance |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A gas turbine combustion chamber, comprising:
a casing, wherein at least one burner is arranged in an end region of the casing; and
at least one hollow element, said hollow element being configured as a closed radial segment, and being in connection with air guidance regions via at least two openings, wherein a plurality of hollow elements are arranged both within and outside the combustion chamber, the hollow elements being in connection with intermediately located air guidance regions via the at least two openings.

2. The gas turbine combustion chamber as claimed in claim 1, wherein the at least one hollow element is configured as a tangential segment.

3. The gas turbine combustion chamber as claimed in claim 1, wherein the at least one hollow element covers a part of an inner surface of the combustion chamber as a tangential segment.

4. The gas turbine combustion chamber as claimed in claim 1, wherein the at least one hollow element covers a part of an outer surface of the combustion chamber as a tangential segment.

5. The gas turbine combustion chamber as claimed in claim 1, wherein the air guidance regions, which are connected to the at least one hollow element via the two openings, are configured as air guidance regions which are separate from one another.

6. The gas turbine combustion chamber as claimed in claim 1, wherein at least one of the two opening of the at least one hollow element is used for the air supply from a first air guidance region of the combustion chamber to the at least one hollow element and at least one second opening is used for the removal of air from the at least one hollow element into a second air guidance region of the combustion chamber.

7. The gas turbine combustion chamber as claimed in claim 1, wherein the at least one hollow element is ceramic.

8. The gas turbine combustion chamber as claimed in claim 1, wherein the at least one hollow element is hollow brick.

9. A gas turbine combustion chamber, comprising:
a casing, wherein at least one burner is arranged in an end region of the casing; and
at least one hollow element, said hollow element being configured as a closed radial segment, and being in connection with air guidance regions via at least two openings, wherein the at least one hollow element is connected with the air guidance regions via the at least two openings, which are arranged in such a way that there is forced tangential air guidance in the peripheral direction inside the hollow element, wherein the air guidance regions of the combustion chamber are formed by ribs which essentially extend axially, and wherein air from a region between two ribs, which are not connected by a cover, is guided through a first opening into a hollow element and is guided back through at least one second opening into the region between two ribs connected by a cover and is guided to the burner.

10. The gas turbine combustion chamber as claimed in claim 9, wherein the at least one hollow element is metallic.

11. The gas turbine combustion chamber as claimed in claim 9, wherein the at least one hollow element is arranged within the combustion chamber and is in connection with an outer region of the combustion chamber via the at least two openings.

12. The gas turbine combustion chamber as claimed in claim 9, wherein the at least one hollow element is arranged outside the combustion chamber and is in connection with an inner region of the combustion chamber via the at least two openings.

13. The gas turbine combustion chamber as claimed in claim 9, wherein the at least one hollow element is configured as a tangential segment.

14. The gas turbine combustion chamber as claimed in claim 9, wherein the at least one hollow element covers a part of an inner surface of the combustion chamber as a tangential segment.

15. The gas turbine combustion chamber as claimed in claim 9, wherein the at least one hollow element covers a part of an outer surface of the combustion chamber as a tangential segment.

16. The gas turbine combustion chamber as claimed in claim 9, wherein the air guidance regions, which are connected to the at least one hollow element via the at least two openings, are configured as air guidance regions which are separate from one another.

17. The gas turbine combustion chamber as claimed in claim 9, wherein at least one of the two openings of the at least one hollow element is used for the air supply from a first air guidance region of the combustion chamber to the at least one hollow element and at least one second opening is used for the removal of air from the at least one hollow element into a second air guidance region of the combustion chamber.

18. The gas turbine combustion chamber as claimed in claim 9, wherein the ribs are integrally configured with the casing.

19. The gas turbine combustion chamber as claimed in claim 9, wherein the casing includes a single-shell configuration.

20. The gas turbine combustion chamber as claimed in claim 9, wherein the combustion chamber includes at least a plurality of hollow elements.

21. The gas turbine combustion chamber as claimed in claim 1, wherein the at least one hollow element is metallic.

22. The gas turbine combustion chamber as claimed in claim 9, wherein the at least one hollow element is ceramic.

23. The gas turbine combustion chamber as claimed in claim 9, wherein the at least one hollow element is hollow brick.

24. The gas turbine combustion chamber as claimed in claim 1, wherein the at least two openings are in the casing.

25. The gas turbine combustion chamber as claimed in claim 9, wherein the at least two openings are in the casing.

26. A gas turbine combustion chamber, comprising:

a casing, wherein at least one burner is arranged in an end region of the casing; and at least one hollow element, said hollow element being configured as a closed radial segment, and being in connection with air guidance regions via at least two openings, wherein the air guidance regions of the combustion chamber are formed by ribs which essentially extend axially, and wherein air from a region between two ribs, which are not connected by a cover, is guided through a first opening into a hollow element and is guided back through at least one second opening into the region between two ribs connected by a cover and is guided to the burner.

27. The gas turbine combustion chamber as claimed in claim 26, wherein the ribs are integrally configured with the casing.

28. The gas turbine combustion chamber as claimed in claim 1, wherein the casing includes a single-shell configuration.

29. A gas turbine combustion chamber, comprising:

a casing, wherein at least one burner is arranged in an end region of the casing; and at least one hollow element, said hollow element being configured as a closed radial segment, and being in connection with air guidance regions, wherein an air guidance region of the combustion chamber is formed by ribs, essentially extending axially from the casing, and wherein air from a region between two ribs, which are not connected by a cover, is guided through a first opening into a hollow element and is guided back through at least one second opening into the region between two ribs connected by a cover and is guided to the burner.

30. The gas turbine combustion chamber of claim 29, wherein at least two hollow elements are included, each in connection with an air guidance region of the combustion chamber via at least one separate opening in the casing.

31. The gas turbine combustion chamber as claimed in claim 30, wherein the air guidance regions, which are each connected to one hollow element via one of the at least two openings, are configured as air guidance regions which are separate from one another.

32. The gas turbine combustion chamber as claimed in claim 29, wherein the ribs are integrally configured with the casing.

* * * * *